United States Patent
Zhang et al.

(10) Patent No.: US 11,188,774 B2
(45) Date of Patent: Nov. 30, 2021

(54) ATTENTIVE MEMORY METHOD AND SYSTEM FOR LOCATING OBJECT THROUGH VISUAL DIALOGUE

(71) Applicant: SEOUL NATIONAL UNIVERSITY R&DB FOUNDATION, Seoul (KR)

(72) Inventors: Byoung-Tak Zhang, Seoul (KR); Cheolho Han, Seoul (KR); Yu-Jung Heo, Gwangmyeong-si (KR); Wooyoung Kang, Seoul (KR); Jaehyun Jun, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/605,800

(22) PCT Filed: Jun. 29, 2018

(86) PCT No.: PCT/KR2018/007410
§ 371 (c)(1),
(2) Date: Oct. 16, 2019

(87) PCT Pub. No.: WO2019/045244
PCT Pub. Date: Mar. 7, 2019

(65) Prior Publication Data
US 2020/0042819 A1 Feb. 6, 2020

(30) Foreign Application Priority Data
Aug. 29, 2017 (KR) .................. 10-2017-0109461

(51) Int. Cl.
*G06K 9/62* (2006.01)
*G06K 9/32* (2006.01)
(Continued)

(52) U.S. Cl.
CPC ..... *G06K 9/3241* (2013.01); *G06F 16/90332* (2019.01); *G06N 3/04* (2013.01); *G10L 15/22* (2013.01)

(58) Field of Classification Search
CPC ............ G06F 16/90332; G06K 9/3241; G06K 9/4628; G06K 9/6271; G06N 3/006;
(Continued)

(56) References Cited

U.S. PATENT DOCUMENTS

| | | | |
|---|---|---|---|
| 2017/0003933 A1* | 1/2017 | Kobayashi | G06K 9/00671 |
| 2017/0124432 A1* | 5/2017 | Chen | G06F 40/30 |
| 2018/0330206 A1* | 11/2018 | Shyshkov | G06K 9/00456 |

FOREIGN PATENT DOCUMENTS

| | | |
|---|---|---|
| KR | 10-2007-0118038 A | 12/2007 |
| WO | 2017-062645 A1 | 4/2017 |

OTHER PUBLICATIONS

Harm De Vries et al., 'GuessWhat?! Visual object discovery through multi-modal dialogue', 2017 IEEE Conference an Computer Vision and Pattern Recognition, pp. 4466-4475, Jul. 21, 2017, https://arxiv.org/abs/1611.08481v1.

(Continued)

*Primary Examiner* — Xin Jia
(74) *Attorney, Agent, or Firm* — KORUS Patent, LLC; Seong Il Jeong

(57) ABSTRACT

There are proposed an attention memory method and system for locating an object through visual dialogue. The attention memory system for identifying an object on an image includes: a control unit which generates a question for identifying a preset object on the image, derives an answer to the generated question, and identifies the preset object on the image based on the question and the answer; and memory which stores the image. The control unit generates the question by incorporating information about objects (Continued)

included in the image into the question, and updates the information about the objects based on the answer.

7 Claims, 2 Drawing Sheets

(51) Int. Cl.
    *G06F 16/9032*    (2019.01)
    *G06N 3/04*    (2006.01)
    *G10L 15/22*    (2006.01)

(58) Field of Classification Search
    CPC ...... G06N 3/04; G06N 3/0445; G06N 3/0454; G06N 3/088; G06N 5/041; G06T 1/00; G06T 7/00; G10L 15/16; G10L 15/22
    See application file for complete search history.

(56) References Cited

OTHER PUBLICATIONS

Caiming Xiong et al., 'Dynamic Memory Networks for Visual and Textual Question Answering', arXiv.org, arXiv:1603.01417v1 [cs. NE], Mar. 4, 2016, https://arxiv.org/abs/1603.01417.

* cited by examiner

ATTENTIVE MEMORY METHOD AND SYSTEM FOR LOCATING OBJECT THROUGH VISUAL DIALOGUE

TECHNICAL FIELD

Embodiments disclosed herein relate to an attention memory method and system for locating an object through visual dialogue, and more specifically to an attention memory method and system which can generate an efficient question by using attention memory configured to store the location information of an object on an image in a method of identifying an object on an image through a dialogue between a questioner and an answerer, which is implemented using artificial intelligence.

Year 2018 Project Numbers and Acknowledgements 1-1. Project No.: 1711065242

1-2. This research was supported by the MSIT (Ministry of Science and ICT), Korea, under the SW Starlab support program (IITP-2018-1711065242) supervised by the IITP (Institute for Information & communications Technology Promotion)

1-3. Contribution rate: ½

2-1. Project No.: 1415155958

2-2. This work was supported by the Technology Innovation Program (or Industrial Strategic Technology Development Program) (1415155958, A robot intelligence software framework as an open and self-growing integration foundation of intelligence and knowledge for personal service robots) funded By the Ministry of Trade & Energy (MOTIE, Korea) 2-3. Contribution rate: ½

BACKGROUND ART

A neural network is information processing technology which imitates the advanced information processing mechanism of a biological nervous system in an engineering manner and performs complex control by correlating inputs and outputs with each other in detail. A neural network is constructed in such a manner that three types of neuron (nerve cell) models, including an input layer which sends signals from switches or sensors, a hidden layer which adjusts correlations while prioritizing inputs and outputs based on the above information, and an output layer which computes and outputs a required control amount based on the above information, are interconnected to one another in a multiple manner.

Such a neural network is used to identify an object on an image, and is applied to various technologies for efficiently recognizing an object.

Among methods of recognizing an object of an image using a neural network as described above, there is a method of identifying a predetermined object on an image in such a manner that two players serving as a questioner and an answerer, respectively, repeat a question and an answer, as in twenty questions.

In other words, a preset object is selected from objects on an image by repeating a process in which a questioner generates a first question for predicting a preset object on a given image, provides the generated first question to an answerer, and generates a second question based on an answer of the answerer to the question and the first question.

However, when the questioner generates a question, he or she generates the question based only on his or her question and the answer of the answerer. Accordingly, a problem occurs in that the questioner does not generate an efficient question including information which is important for the identification of an object.

In connection with this, Korean Patent Application Publication No. 10-2017-0033398, which is a related art document, discloses technology related to the implementation of a neural network for a speech recognition system.

However, only frame skipping and a demand distance using approximated skip frames are computed such that only output required by a speech decoder is provided through a neural network or approximation technique, but an efficient question cannot be generated in the dialogue system as described above.

Therefore, there is a need for technology which is capable of overcoming the above-described problems.

Meanwhile, the above-described background technology corresponds to technical information which has been possessed by the present inventor in order to contrive the present invention or which has been acquired in the process of contriving the present invention, and can not necessarily be regarded as well-known technology which had been known to the public prior to the filing of the present invention.

DISCLOSURE

Technical Problems

Embodiments disclosed herein are intended to propose an attention memory method and system for locating an object through visual dialogue.

Furthermore, embodiments disclosed herein are intended to propose an attention memory method and system which generate a question by using the location of an object on an image stored in attention memory.

Moreover, embodiments disclosed herein are intended to propose an attention memory method and system which generate an efficient question by updating the location of an object on an image stored in attention memory through dialogue.

Technical Solution

The technical solution for solving the above-described technical problems is to generate a question to identify an object on an image and to identify the object on the image based on an answer to the generated question.

Advantageous Effects

According to any one of the above-described technical solutions, there can be proposed the attention memory method and system for locating an object through visual dialogue.

Furthermore, according to any one of the above-described technical solutions, there can be proposed the attention memory method and system which generate a question by using the location of an object on an image stored in the attention memory.

In addition, the embodiments disclosed herein can propose the attention memory method and system which generate an efficient question by updating the location of an object on an image stored in the attention memory through a dialogue.

The effects which can be acquired by the embodiments disclosed herein are not limited to the above-described effects, and other effects which have not been described above will be apparently understood by those having ordinary skill in the art, to which the present invention pertains, from the following description.

BEST MODE

Figure 1:
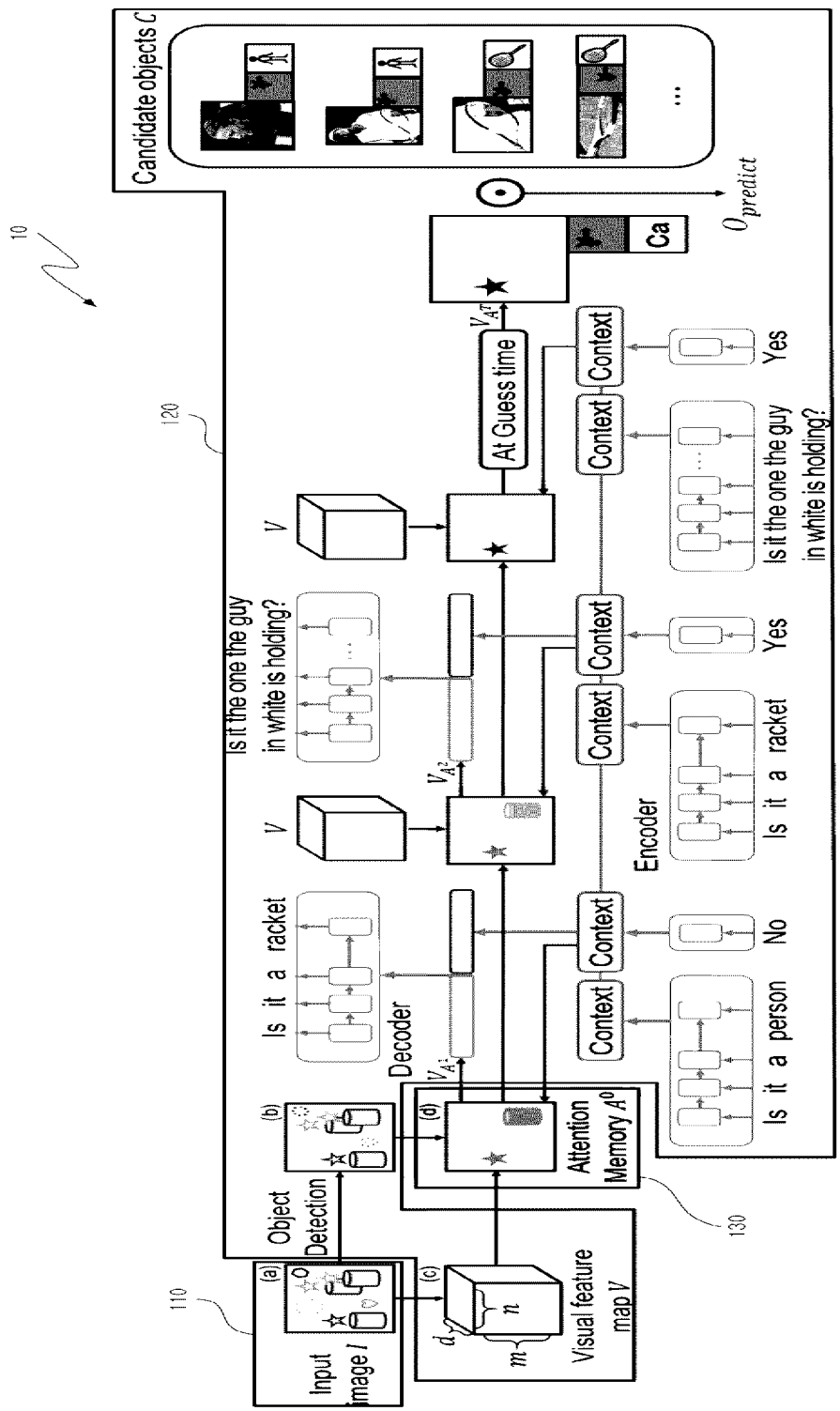
FIG. 1 is a block diagram showing an attention memory system according to one embodiment.

As a technical solution for solving the above technical problems, according to one embodiment, there is provided an attention memory system for identifying an object on an image, the attention memory system including: a control unit which generates a question for identifying a preset object on the image, derives an answer to the generated question, and identifies the preset object on the image based on the question and the answer; and memory which stores the image; wherein the control unit generates the question by incorporating information about objects included in the image into the question, and updates the information about the objects based on the answer.

According to another embodiment, there is provided an attention memory method by which an attention memory system identifies an object on an image, the attention memory method including: receiving an input of the image; generating a question for identifying a preset object by incorporating information about objects included in the image into the question, and deriving an answer to the generated question; and identifying a preset object on the image based on at least one question, the question, and the answer; wherein the attention memory method further includes updating the information about the objects based on the answer.

According to another embodiment, there is provided a computer-readable storage medium having stored thereon a program which performs an attention memory method, the attention memory method including: receiving an input of the image; generating a question for identifying a preset object by incorporating information about objects included in the image into the question, and deriving an answer to the generated question; and identifying a preset object on the image based on at least one question, the question, and the answer; wherein the attention memory method further includes updating the information about the objects based on the answer.

According to another embodiment, there is provided a computer program which is executed by an attention memory system and which is stored in a storage medium to perform an attention memory method, the attention memory method including: receiving an input of the image; generating a question for identifying a preset object by incorporating information about objects included in the image into the question, and deriving an answer to the generated question; and identifying a preset object on the image based on at least one question, the question, and the answer; wherein the attention memory method further includes updating the information about the objects based on the answer.

Mode for Invention

Various embodiments will be described in detail below with reference to the accompanying drawings. The following embodiments may be modified to various different forms and then practiced. In order to more clearly illustrate features of the embodiments, detailed descriptions of items which are well known to those having ordinary skill in the art to which the following embodiments pertain will be omitted. Furthermore, in the drawings, portions unrelated to descriptions of the embodiments will be omitted. Throughout the specification, similar reference symbols will be assigned to similar portions.

Throughout the specification, when one component is described as being "connected" to another component, this includes not only a case where the one component is 'directly connected' to the other component but also a case where the one component is 'connected to the other component with a third component disposed therebetween.' Furthermore, when one portion is described as "including" one component, this does not mean that the portion does not exclude another component but means that the portion may further include another component, unless explicitly described to the contrary.

The embodiments will be described in detail below with reference to the accompanying drawings.

Prior to the following description, the meanings of the terms used below will be defined first.

In the following description, the term 'visual feature map' refers to an array of values representing features of an object included in an image from an input image, and may correspond to, e.g., values obtained by extracting information about the corners of an object included in an image.

Furthermore, the term 'attention memory feature map' refers to values representing features of a candidate object which can be selected as a preset object on an image, and corresponds to information which is generated based on a visual feature map and the location information of one or more objects identified on an image.

In addition to the terms defined above, terms which require descriptions will be defined separately below.

FIG. 1 is a block diagram illustrating an attention memory system 10 according to one embodiment.

The attention memory system 10 acts as an answerer who knows information about a preset object on an image, a questioner who generates a question in order to acquire the information about the preset object of one or more objects on the image, and a predictor who selects the preset object from the one or more objects on the image based on a dialogue between the questioner and the answerer. The predictor selects the preset object based on information acquired through the dialogue between the questioner and the answerer.

The attention memory system 10 may be implemented as a server-client system. A client may be installed on an electronic terminal, and may communicate with a server.

In this case, the user terminal may be implemented as a computer, a portable terminal, a television, a wearable device, or the like which can access a remote server or can be connected to another terminal and a server over the network N. In this case, the computer includes, e.g., a notebook, a desktop, a laptop, and the like each equipped with a web browser. The portable terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type which can be directly worn on a human body, such as a watch, glasses, an accessory, clothing, shoes, or the like, and can access a remote server or be connected to another terminal directly or via another information processing device over a network.

Furthermore, the server may be implemented as a computer capable of communicating with the electronic terminal over the network N, and may include a storage device capable of storing data or store data via a third server (not shown).

As described above, the attention memory system 10 according to the one embodiment of the present invention may include an input and output unit 110, a control unit 120, a communication unit 130, and memory 130.

The input and output unit 110 may include an input unit for receiving input from a user and an output unit for displaying information about the results of performance of work, the state of the attention memory system 10, and the like. For example, input and output unit 110 may include an operation panel receiving user input and a display panel displaying screens.

More specifically, the input unit may include devices capable of receiving various types of user input, such as a keyboard, physical buttons, a touch screen, a camera, a microphone, and the like. Furthermore, the output unit may include a display panel, a speaker, and the like. However, the input and output unit 110 are not limited thereto, but may include various components supporting input and output.

The control unit 120 controls the overall operation of the attention memory system 10, and may include a processor, such as a CPU or the like. The control unit 120 may control other components included in the attention memory system 10 so that they can perform an operation corresponding to user input received via the input and output unit 110.

For example, the control unit 120 may execute a program stored in the memory 130, may read a file stored in the memory 130, or may store a new file in the memory 130.

The control unit 120 may identify one or more objects included in an image with respect to the image input through the input and output unit 110.

For example, the control unit 120 may identify one or more objects with respect to an image through an object detection model which is called YOLO (You only look once).

Furthermore, the control unit 120 may extract the locations of the identified one or more objects, and may initialize attention memory on the memory 130, to be described later, based on information about the extracted locations of the one or more objects.

For example, the control unit 120 may allocate a predetermined area to the memory 130 as the attention memory, may extract location information about relative locations on the image for the one or more objects identified in the image, and may store the location information in the attention memory.

Thereafter, the control unit 120 may extract a visual feature map including features of the one or more objects included in the image.

For example, the control unit 120 may extract the visual feature map from the image through Convolutional Auto-Encoders (CASs).

Furthermore, the control unit 120 may generate a question for identifying a predetermined object on the image.

For this purpose, the control unit 120 may pre-store one or more words or obtain one or more words through a third server so as to form a question according to an embodiment.

First, the control unit 120 may generate a start question in order to start a dialogue, and may give an answer to the start question.

For example, the control unit 120 may randomly generate the question "Are you a human?" in order to start a dialogue, and may give the answer "No" to the generated question.

Furthermore, the control unit 120 may update attention memory information stored in the attention memory based on the answer to the start question and the visual feature map.

For example, the control unit 120 may delete information about a human on the image from the locations of the one or more objects on the image, which is the attention memory information stored in the attention memory, based on the answer "No" to the question "Are you a human?."

Thereafter, the control unit 120 may generate an attention memory feature map (a feature map with attention memory values) based on the attention memory information and the visual feature map, and may generate a question based on the generated attention memory feature map and the answer to the question.

In other words, the control unit 120 may generate a question related to a candidate object of the one or more objects on the image based on the visual feature map including the feature information of the objects on the image and the attention memory information including information about the candidate object.

For example, the control unit 120 may extract a visual feature map for a "racket, ball" from the visual feature map based on the locations of the "racket, ball" excluding a "human" from the attention memory information and generate an attention memory feature map, and may generate a question related to the "racket" or "ball" based on the generated attention memory feature map.

Furthermore, the control unit 120 may derive an answer to the newly generated question, and may reduce the number of candidate objects by updating the attention memory information based on the derived answer and the visual feature map.

Thereafter, the control unit 120 may repeat the process of generating an attention memory feature map, the number of candidate objects of which has been reduced, by using the attention memory information, updated as described above, and the visual feature map, generating a question, deriving an answer to the generated question, and updating the attention memory information.

Furthermore, the control unit 120 may select a preset object from the one or more objects on the image based on the attention memory information stored in the attention memory.

For example, the control unit 120 may select the preset object through comparison with the attention memory information, the space information of the image, and an example object for each category.

Various types of data, such as a file, an application, and a program, may be installed and stored in the memory 130. The control unit 120 may access and use the data stored in the memory 130, or may store new data in the memory 130. Furthermore, the control unit 120 may execute a program installed in the memory 130. Referring to FIG. 1, a program for performing an intention memory method may be installed in the memory 130.

The memory 130 may store an image input through the input and output unit 110.

Furthermore, the memory 130 may be allocated attention memory capable of temporarily storing information by the control unit 120, and the attention memory information calculated by the control unit 120 may be stored in the allocated attention memory.

Figure 2:
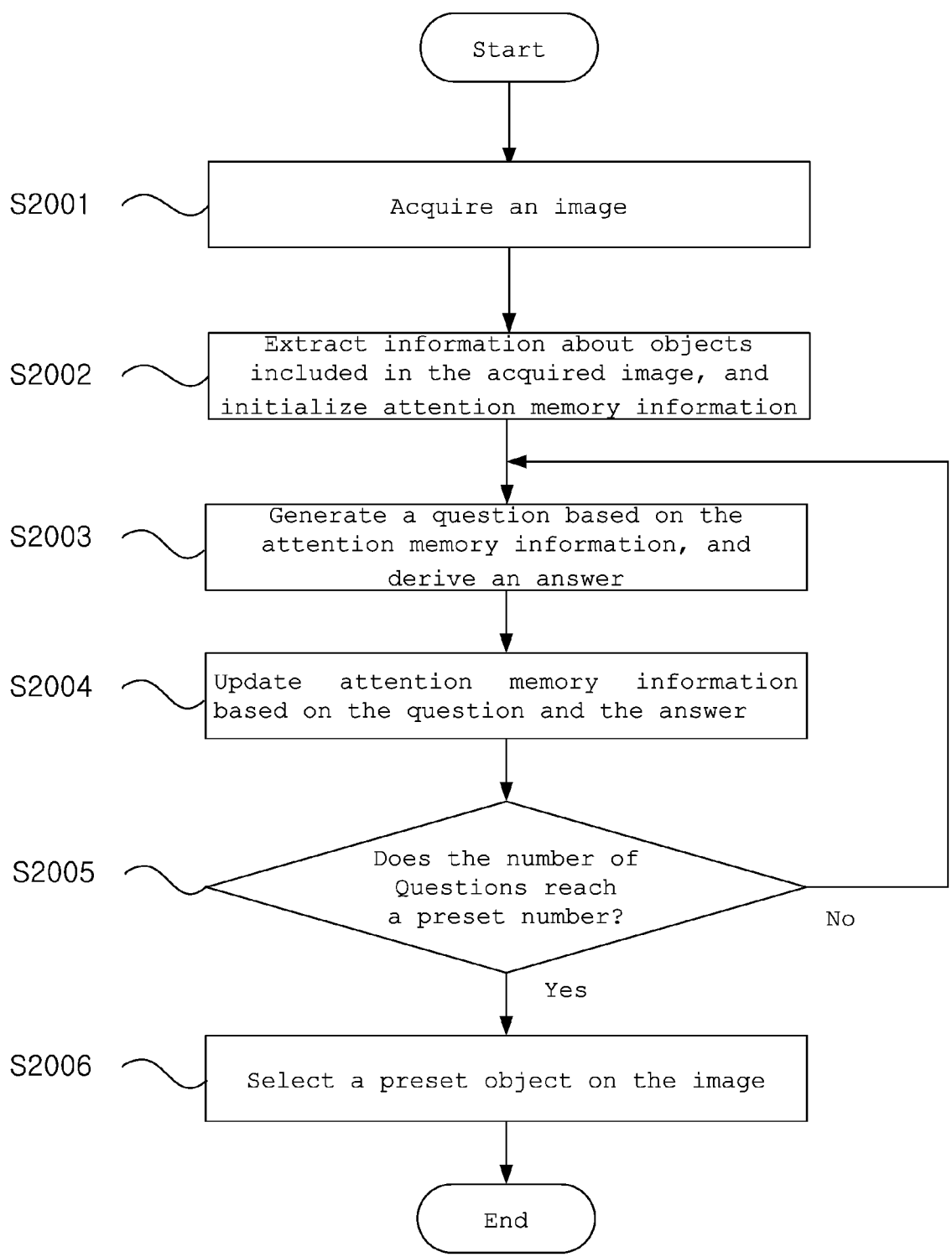
FIG. 2 is a flowchart illustrating an attention memory method according to one embodiment.

FIG. 2 is a flowchart illustrating an attention memory method according to one embodiment.

The attention memory method according to the embodiment shown in FIG. 2 includes steps which are performed in a time-series manner in the attention memory system 10 shown in FIG. 1. Accordingly, the descriptions which are omitted below but are given above in conjunction with the attention memory system 10 shown in FIG. 1 may be also applied to the attention memory method according to the embodiment shown in FIG. 2.

First, the attention memory system 10 may acquire an image at step S2001.

In other words, the attention memory system 10 may receive an image including a preset object, and may store the input image. In this case, the image may include one or more objects.

Furthermore, the attention memory system 10 may extract the locations of respective identified one or more objects.

For example, the attention memory system 10 may apply a YOLO object detection method to the image acquired at step S2001, may divide the image into one or more areas and display a bounding box at a position predicted to be an object, and may detect one or more objects from an image in real time through a bounding box to which a weight is applied according to a predicted probability.

Thereafter, the attention memory system 10 may initialize the attention memory information of the attention memory allocated to the memory based on the locations of the respective extracted one or more objects at step S2002.

Furthermore, the attention memory system 10 may extract a visual feature map including features of the one or more objects included in the image.

According to an embodiment, the attention memory system 10 may extract feature information about the objects on the image through CAEs.

For example, the attention memory system 10 may extract a visual feature map representing the values of the boundary lines of the objects included in the image by applying a filter capable of extracting the boundary lines of objects to the image through convolution computation.

Furthermore, the attention memory system 10 may generate a question for identifying a preset object on the image and derive an answer to the generated question at step S2003.

For this purpose, the attention memory system 10 may generate an attention memory feature map based on the visual feature map and the attention memory information stored in the attention memory.

In other words, the attention memory system 10 may generate the attention memory feature map corresponding to features of the one or more objects included in the image, i.e., candidate objects which may be selected as a preset object, by using information about the boundary lines of the objects on the image and information based on the locations of the objects detected on the image.

Furthermore, the attention memory system 10 may generate a question based on a context vector, which is information about an existing question and answer, and the attention memory feature map.

For example, the attention memory system 10 may generate a natural language question in a current state by inputting a value, derived by inputting a value, output by an encoder based on the existing question and answer via Long Short-Term memory (LSTM) and a Hierarchical Recurrent Encoder Decoder (HRED), to an context layer, and the attention memory feature map to a decoder.

Furthermore, the attention memory system 10 may derive an answer to the generated question.

For example, the attention memory system 10 may derive any one of the answers "Yes" and "No" to the question "Is it a bicycle" via a Multi-Layer Perceptron (MLP).

Thereafter, the attention memory system 10 may update the attention memory information stored in the attention memory based on the existing question and answer and the visual feature map at step S2004.

In other words, the attention memory system 10 may update the attention memory information stored in the attention memory based on the value output by the encoder at step S2003 and the visual feature map.

For example, the attention memory system 10 may eliminate information about the "bicycle" from the attention memory information based on a context vector including "No," i.e., an answer to the question "Is it a bicycle?," and the visual feature map.

Furthermore, at step S2005, the attention memory system 10 may generate a preset number of questions by repeating steps S2003 and S2004 and drive answers to the questions, and may determine whether the number of questions generated reaches a preset number.

In this case, the attention memory system 10 may update the attention memory information during the process of repeating the questions and the answers, and may generate an effective question based on the updated attention memory information.

Thereafter, at step S2006, once the questions and the answers have been completed, the attention memory system 10 may select a preset object on the image based on the attention memory information stored in the attention memory and an example object provided for each of categories for dividing objects.

For example, the attention memory system 10 may select the preset object from candidate objects on the image through comparison with the attention memory information which is information about a candidate object close to the preset object, the space information of the objects on the image, and the categories of the objects.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

The attention memory method according to the embodiment described in conjunction with FIG. 2 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the attention memory method according to the embodiment described in conjunction with FIG. 2 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the attention memory method according to the embodiment described in conjunction with FIG. 2 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection desired via the present specification should be defined by the attached claims, rather than the detailed description. All modifications and variations which can be derived from the meanings, scopes and equivalents of the claims should be construed as falling within the scope of the present invention.

The invention claimed is:

1. An attention memory system for identifying an object on an image, the attention memory system comprising:
    a control unit which generates a question for identifying a preset object on the image, derives an answer to the generated question, and identifies the preset object on the image based on the question and the answer; and
    memory which stores the image;
    wherein the control unit identifies one or more objects on the image, extracts locations of the respective identified one or more objects, initializes attention memory on the memory based on information about the extracted locations of the respective one or more objects, extracts a visual feature map including features of the one or more objects included in the image, generates an attention memory feature map based on the visual feature map and attention memory information which is the information about the locations of the objects stored in the attention memory, generates the question based on the generated attention memory feature map, and updates the attention memory information based on the answer.

2. The attention memory system of claim 1, wherein the control unit updates the attention memory information based on the answer and the visual feature map.

3. The attention memory system of claim 2, wherein the control unit selects the preset object from the image based on the attention memory information.

4. An attention memory method by which an attention memory system identifies an object on an image, the attention memory method comprising:
    receiving an input of the image;
    identifying the one or more objects on the image;
    extracting locations of the respective identified one or more objects, and initializing attention memory on memory based on information about the extracted locations of the one or more objects;
    extracting a visual feature map including features of the one or more objects included in the image;

generating an attention memory feature map based on the visual feature map and attention memory information which is the information about the locations of the objects stored in the attention memory;

generating a question based on the generated attention memory feature map and deriving an answer to the generated question; and identifying a preset object on the image based on the question, and the answer;

wherein the attention memory method further comprises updating the attention memory information based on the answer.

5. The attention memory method of claim 4, wherein updating the attention memory information based on the answer comprises:

updating the attention memory information based on the answer and the visual feature map.

6. The attention memory method of claim 5, wherein identifying the preset object comprises:

selecting the preset object on the image based on the attention memory information.

7. A non-transitory computer-readable storage medium having stored thereon a program which performs the method set forth in claim 4.

* * * * *